(12) United States Patent
Samaniego et al.

(10) Patent No.: US 7,898,468 B2
(45) Date of Patent: Mar. 1, 2011

(54) RADAR IMAGING OF BUILDINGS USING MODEL-BASED FOCUSING AND DATA-BASED FOCUSING

(75) Inventors: Raymond Samaniego, Prosper, TX (US); Stanley V. Birleson, Heath, TX (US)

(73) Assignee: Raytheon Company, Waltham, MA (US)

( * ) Notice: Subject to any disclaimer, the term of this patent is extended or adjusted under 35 U.S.C. 154(b) by 86 days.

(21) Appl. No.: 12/370,377

(22) Filed: Feb. 12, 2009

(65) Prior Publication Data
US 2009/0207067 A1 Aug. 20, 2009

Related U.S. Application Data

(60) Provisional application No. 61/065,738, filed on Feb. 14, 2008.

(51) Int. Cl.
*G01S 13/00* (2006.01)
(52) U.S. Cl. .................... 342/179; 342/25 R
(58) Field of Classification Search ............ 342/25 R
See application file for complete search history.

(56) References Cited

U.S. PATENT DOCUMENTS 6,255,981 B1 * 7/2001 Samaniego ............ 342/25 R
6,413,869 B1 * 7/2002 Achuthan et al. ........... 438/690
2004/0153264 A1 * 8/2004 Teich et al. .................... 702/65
2004/0208373 A1 * 10/2004 Aoki et al. ................... 382/191
2006/0284757 A1 * 12/2006 Zemany ....................... 342/22

OTHER PUBLICATIONS

Wang, Genyuan; Amin, Moeness G.; and Zhang, Yimin, "New Approach for Target Locations in the Presence of Wall Ambiguities," ICCC Transactions on Aerospace and Electronic Systems, vol. 42, No. 1, XP007908629, pp. 301-315, Jan. 2006.
Dehmollaian, Mojtaba; and Sarabandi, Kamal; "Refocusing Through Building Walls Using Synthetic Aperture Radar," IEEE, Antennas and Propagation International Symposium, pp. 1465-1468, Jun. 1, 2007.
Notification of Transmittal of the International Search Report and the Written Opinion of the International Searching Authority, or the Declaration; for PCT/US2009/034014, EPO/ISA, 16 pages, May 28, 2009.

* cited by examiner

*Primary Examiner*—Thomas H Tarcza
*Assistant Examiner*—Timothy A Brainard
(74) *Attorney, Agent, or Firm*—Baker Botts L.L.P.

(57) ABSTRACT

According to one embodiment, an image generating device includes an image former coupled to a radar that transmits and receives electro-magnetic radiation at multiple frequencies. The image former generates an image using information received from the radar, adjusts the image according to a material characteristic of the object, and combines the image with other images received at differing frequencies to form a resulting image.

17 Claims, 7 Drawing Sheets

RADAR IMAGING OF BUILDINGS USING MODEL-BASED FOCUSING AND DATA-BASED FOCUSING

RELATED APPLICATIONS

This application claims priority to U.S. Provisional Patent Application Ser. No. 61/065,738, entitled "RADAR IMAGE GENERATION DEVICE," which was filed on Feb. 14, 2008.

GOVERNMENT RIGHTS

This invention was made with Government support under Contract Number HR0011-06-C-0111 DARPA VisiBuilding Phase 1. The Government has certain rights in this invention

TECHNICAL FIELD OF THE DISCLOSURE

This disclosure generally relates to image generating devices, and more particularly, to a radar image generating device and a method of operating the same.

BACKGROUND OF THE DISCLOSURE

Radars detect remote objects by transmitting a beam of electro-magnetic energy and subsequently measuring reflected electro-magnetic energy from the object. Radars may be used to detect the presence and/or motion of objects having electrical dielectric properties that differ from the ambient environment. For example, radars may be used to detect weather related phenomena, such as cloud cover or precipitation, or various topographical features of the Earth.

SUMMARY OF THE DISCLOSURE

According to one embodiment, an image generating device includes an image former coupled to a radar that transmits and receives electro-magnetic radiation at multiple frequencies. The image former generates an image using information received from the radar, adjusts the image according to a material characteristic of the object, and combines the image with other images received at differing frequencies to form a resulting image.

Some embodiments of the disclosure may provide certain technical advantages. For example, according to one embodiment, the image generating device may provide imagery having greater resolution than other images generating devices that generate imagery from radars. Enhanced resolution may be provided by one or more material characteristics that may be used to focus images using information received from a radar. The material characteristics include various types of information about the object that may affect the manner in which electro-magnetic radiation propagates through the object. The image generating device factors these material characteristics with received information to compensate for aberrations. A data-based focusing technique using a spatially varying, along-range focus may then be applied yielding imagery that may have enhanced resolution over known radar image generating devices.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Resolution of images derived from radars may be generally related to the size of their antennas that focus transmitted and received electro-magnetic radiation. To enhance resolution of images provided by radars, multiple images generated by the radar may be combined to form a resulting image. Radars using this image enhancing technique are generally referred to as synthetic aperture radars. These synthetic aperture radars, however, are often limited in the resolution of images they produce.

Figure 1:
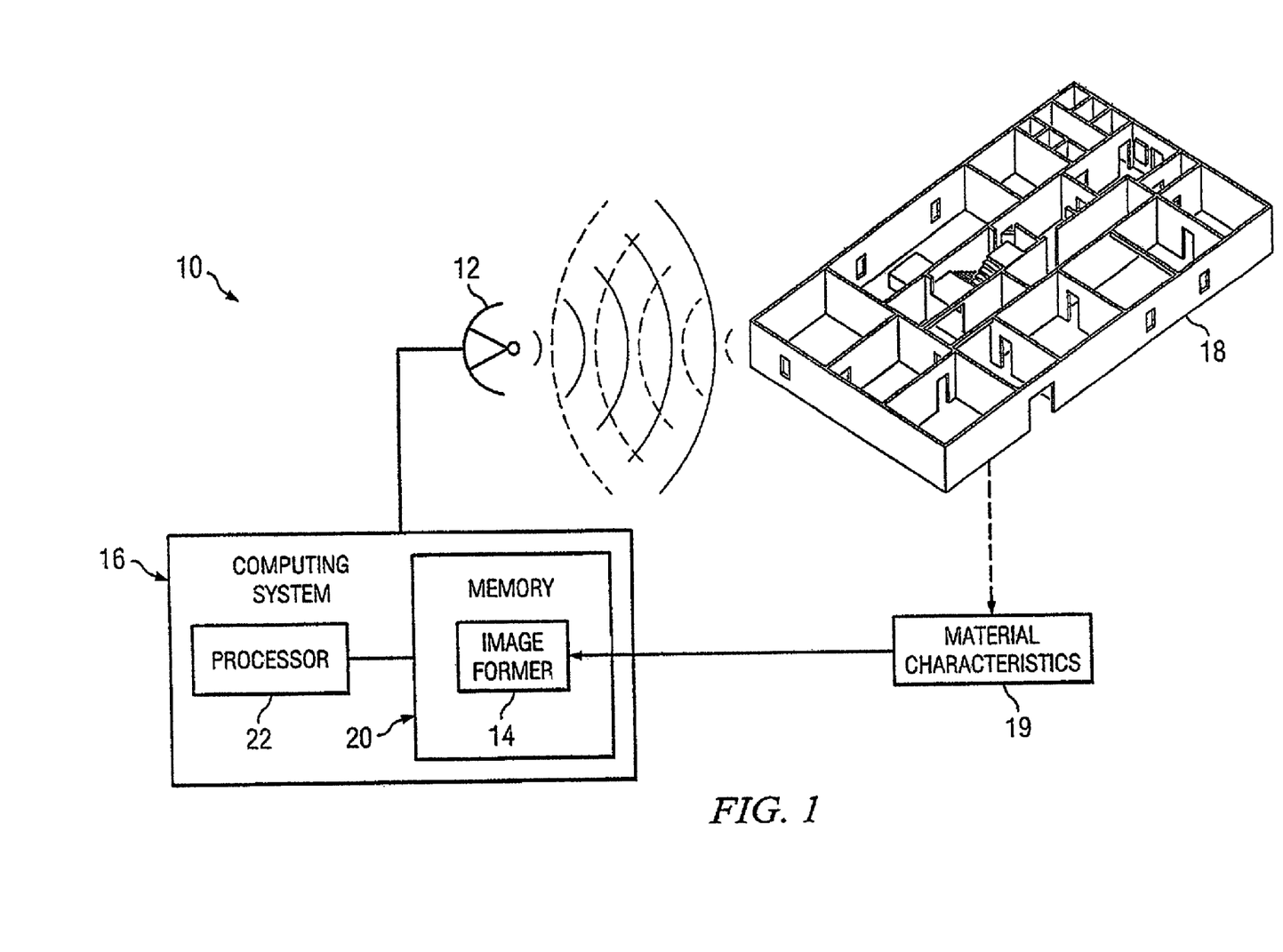
FIG. 1 is a block diagram showing one embodiment of a radar image generating device according to the teachings of the present disclosure.

FIG. 1 shows one embodiment of a radar image generating device 10 according to the teachings of the present disclosure. Radar image generating device 10 includes a radar 12 coupled to an image former 14 that is executed on a computing system 16. Radar 12 generates information regarding an object 18, which in this case is a building, by transmitting electro-magnetic energy and subsequently measuring reflected electro-magnetic energy returning from object 18. As will be described in detail below, image former 14 uses material characteristics 19 known about object 18 to adjust images to compensate for aberrations introduced by the various elements of object 18.

Certain embodiments of the radar image generating device 10 may provide resulting images having enhanced resolution over known radar image generating devices. Image information may be iteratively adjusted during acquisition of images to account for characteristics that may affect electro-magnetic radiation reflected by or propagating through object 18. For the above example in which object 18 is a building, its walls may be formed of concrete having a characteristic thickness and dielectric constant. These concrete walls, therefore, may impart a characteristic diffraction, reflection, and/or attenuation to electro-magnetic radiation generated by radar 12. By adjusting the image to account for these material characteristics 19, the resolution of resulting images generated by radar image generating device 10 may be enhanced in some embodiments.

Radar 12 may be any suitable type of radar that may be, for example, a mechanically scanned array or an active electronically scanned array. In one embodiment, radar 12 includes multiple antenna elements that have an orientation that remain relatively fixed during acquisition of electro-magnetic radiation. These relatively fixed antenna elements may be mounted on a portable platform such as a truck for movement of antenna elements relative to object 18. Radar 12 generates image information by transmitting and receiving electro-magnetic energy over a range of frequencies. For example, radar 12 may generate image information using electro-magnetic energy at frequencies ranging from 600 Mega-Hertz to 1200 Mega-Hertz in increments of 2.5 Mega-Hertz. By combining images derived from electro-magnetic signals that vary in relatively small increments, such as 2.5 Mega-Hertz increments, phase noise, may be effectively reduced according to the Nyquist criterion. In other embodiments, radar 12 may generate image information using frequencies that range from 500 Mega-Hertz to 3000 Mega-Hertz.

Image former 14 includes instructions stored in a memory 20 and executed by a processor 22 of computing system 16. Computing system 16 may be any suitable computing system, such as a network coupled computing system or a stand-alone computing system. Examples of stand-alone computing systems may include a personal computer, a personal digital assistant (PDA), a laptop computer, or a mainframe computer. A network computing system may be a number of computers coupled together via a network, such as a local area network (LAN), a metropolitan area network (MAN), or a wide area network (WAN) that collectively execute the instructions of image former 14.

Image former 14 adjusts images using information generated from radar 12 at each of multiple frequencies. Adjustment of images may be accomplished using one or more determined material characteristics 19 of object 18. Adjustment of images using material characteristics 19 may refer to a type of focusing technique commonly referred to as model-based focusing. Material characteristics 19 may be any aspect of object 18 that influences the propagation path of electro-magnetic radiation used by radar 12. As an example in which object 18 is a building, its walls may be formed of a material that may influence the propagation path of electro-magnetic radiation. Knowledge of the material characteristics 19 of the building's walls may therefore, be used to correct aberrations in images generated by radar 12. One embodiment for adjusting images by image former 14 is shown in the following pseudo-code segment:

```
Loop though radar positions along the synthetic aperture,
x_r, y_r, z_r
    Loop through frequency steps, f = f + delta_f
        Loop through image pixels / voxels, x_i, y_i, z_i
            Generate complex image for frequency f,
voxel x_i, y_i, z_i
            R_two_way=R_TX+R_RX+R_walls_delta;
            focus=exp(j*2*pi*R_two_way*f/
            speed_of_light);
            c_im(x_i,y_i,z_i)=c_im(x_i,y_i,z_i)+mag(f)*
            exp(j*phs(f))*focus;
        End pixel/voxel loop
    End frequency loop
End radar position loop
```

Where:

$x_i, y_i, z_i$ represents the position of the voxel in image;

f represents the frequency of the received electro-magnetic radiation;

j represents the complex value $(-1)^{1/2}$;

R_walls_delta represents a value indicative of propagation delay through walls;

R_TX represents the propagation time from radar 12 to object 18; and

R_RX represents the propagation time from object 18 to antenna 12.

As shown, the first three statements form a nested loop. The outer loop forms multiple images at various positions of radar 12 to object 18. The next loop combines multiple images that have been acquired at the differing frequencies of radar 12. The inner loop applies a wall delta characteristic (R_walls_delta) to compensate for modification of the propagation path of electro-magnetic radiation through the walls of building at a specific frequency of electro-magnetic radiation. The wall delta characteristic represents the additional path traveled due to diffraction within the walls of the building. Once images from multiple frequencies have been individually adjusted, they may be combined using the second nested loop.

Figure 2:
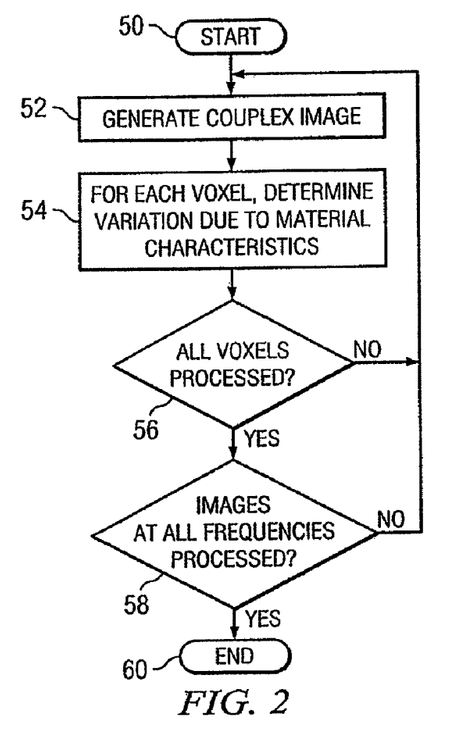
FIG. 2 is a flowchart showing one embodiment of a series of actions that may be performed by the image former of FIG. 1 to adjust image according to one or more material characteristics.

FIG. 2 is a flowchart showing actions that may be performed by image former 14 using the previous pseudo-code segment. In act 50 the process in initiated.

In act 52, image former 14 generates a complex image from the received electro-magnetic radiation. In one embodiment, radar 12 has multiple receive antenna elements that receive electro-magnetic radiation at differing positions relative to one another. In this manner, the received electro-magnetic radiation signals may exhibit phase differences based upon the internal features of object 18. Image former 14 uses this phase information to generate complex images.

In act 54, image former adjusts the image according to known material characteristics 19 at each voxel. The wall delta characteristic may be determined in any manner. In one embodiment, the wall delta characteristic is manually determined. Manual determination of the wall delta characteristic may include visual inspection of the building coupled with knowledge of common building practices in the particular region of interest. For example, visual inspection of a building may determine that a particular building of interest resembles buildings that are constructed using concrete blocks having a certain thickness. This information may then be used to formulate a wall delta characteristic for adjusting images at each frequency. In another embodiment, the wall delta characteristic may be heuristically determined in which an estimated value is iterated until suitable adjustment is achieved. In another embodiment, the wall delta characteristic may be determined using an automated artificial intelligence algorithm.

In act 56, image former 14 may continue processing additional voxels of the image in which acts 52 and 54 are repeated. When all voxels are processed, processing continues in act 58 in which image former 14 may process additional images from information received at other frequencies. If images from differing frequencies are processed, the process ends at act 60.

In one embodiment, image former 14 applies a phase gradient factor to one or more selected regions to compensate for phase error in the selected region. Adjustment of images using phase gradient factors generally refer to a type of focusing technique commonly referred to as data-based focusing. One embodiment for applying a phase gradient factor to images by image former 14 is shown in the following pseudo-code segment:

```
Loop through segments of the image
    Inverse transform along the range dimension using an
    inverse FFT;
        Phase estimation convergence loop
```

-continued

```
        Phi_dot(n) = angle ( c_im(n+1,m) .* conjugate(
    c_im(n,m) ) );
            For n=2 to N...Phi(n,m) = Phi(n-1,m) +
    Phi_dot(n); next n;
        End Phase Estimation Loop
    End rectangular segment Loop
    Take the inverse FFT of the complex image in the range
      dimension;
    Multiply the resulting matrix by the focus matrix exp(-
    j*Phi);
    Take a forward FFT to convert back to the complex image;
    End focus application
``` where:

cim(n,m) represents the inverse transform value of each voxel;

j represents the complex value $(-1)^{1/2}$; and

Phi_dot(n) represents the dot product at each voxel of the inverse transform.

As shown, the first statement forms a loop through which a phase gradient factor is applied to various segments of the image. The various segments may include overlapping rectangles in which the central portion of segment receives relatively greater adjustment than the outer regions. The fourth statement modifies the algorithm by removing the linear phase removal step in order to prevent walls from moving within the image. The fifth statement integrates the phase error gradient to get the phase error. The eighth, ninth, and tenth statements applies the phase gradient factor to the segments by performing an inverse fast Fourier transform (FFT) of the image, applying the phase gradient factor, and subsequently performing a forward fast Fourier transform to obtain the filtered image.

Figure 3:
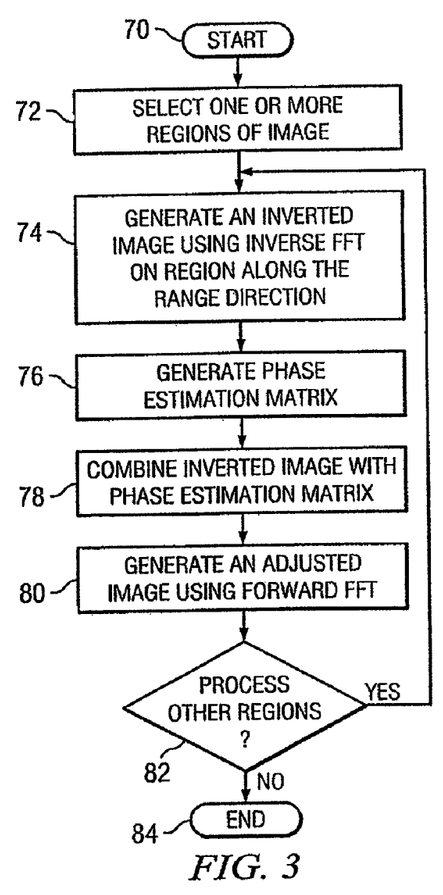
FIG. 3 is a flowchart showing one embodiment of a series of actions that may be performed by the image former of FIG. 1 to adjust the image according to a phase error gradient.

FIG. 3 is a flowchart showing actions that may be performed by image former 14 using the previous pseudo-code segment. In act 70 the process in initiated.

In act 72, image former 14 selects one or more regions of an image for processing. In one embodiment, these regions may be selected to cover a particular region including an internal feature of object 18 such as a wall, a staircase, or a person in a building.

In act 74, image former 14 generates an inverted image of the selected region using an inverse fast Fourier transform.

In act 76, image former 14 generates a phase estimation matrix using phase information at each voxel of the inverted image. In one embodiment, image former 14 integrates the voxels to determine a phase error gradient over the region.

In act 78, image former 14 combines the inverted image with the phase estimation matrix to filter phase aberrations and converts the inverted image to an adjusted image by applying a forward fast Fourier transform to the inverted image in act 80.

In act 82, if additional regions are selected the processing, image former 14 repeats act 74 through 80 again. If no additional regions are to be processed, processing continues at act 84 in which the process ends.

Figure 4A:
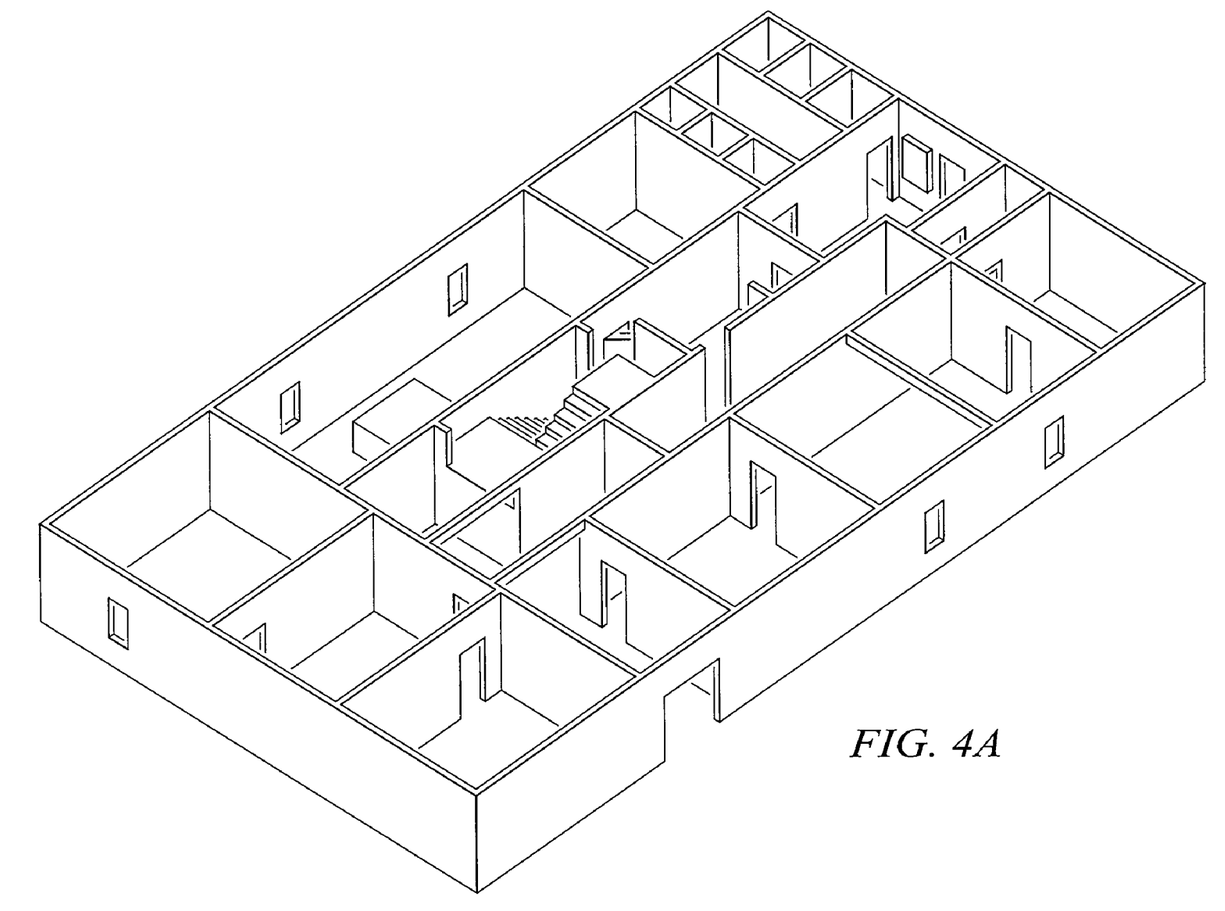
FIG. 4A is an illustration of an example object of FIG. 1.

FIG. 4A is an illustration of object 18 of FIG. 1, which in this case, is a building. In other embodiments, object 18 may be any type of structure having internal features to be imaged.

Figure 4B:
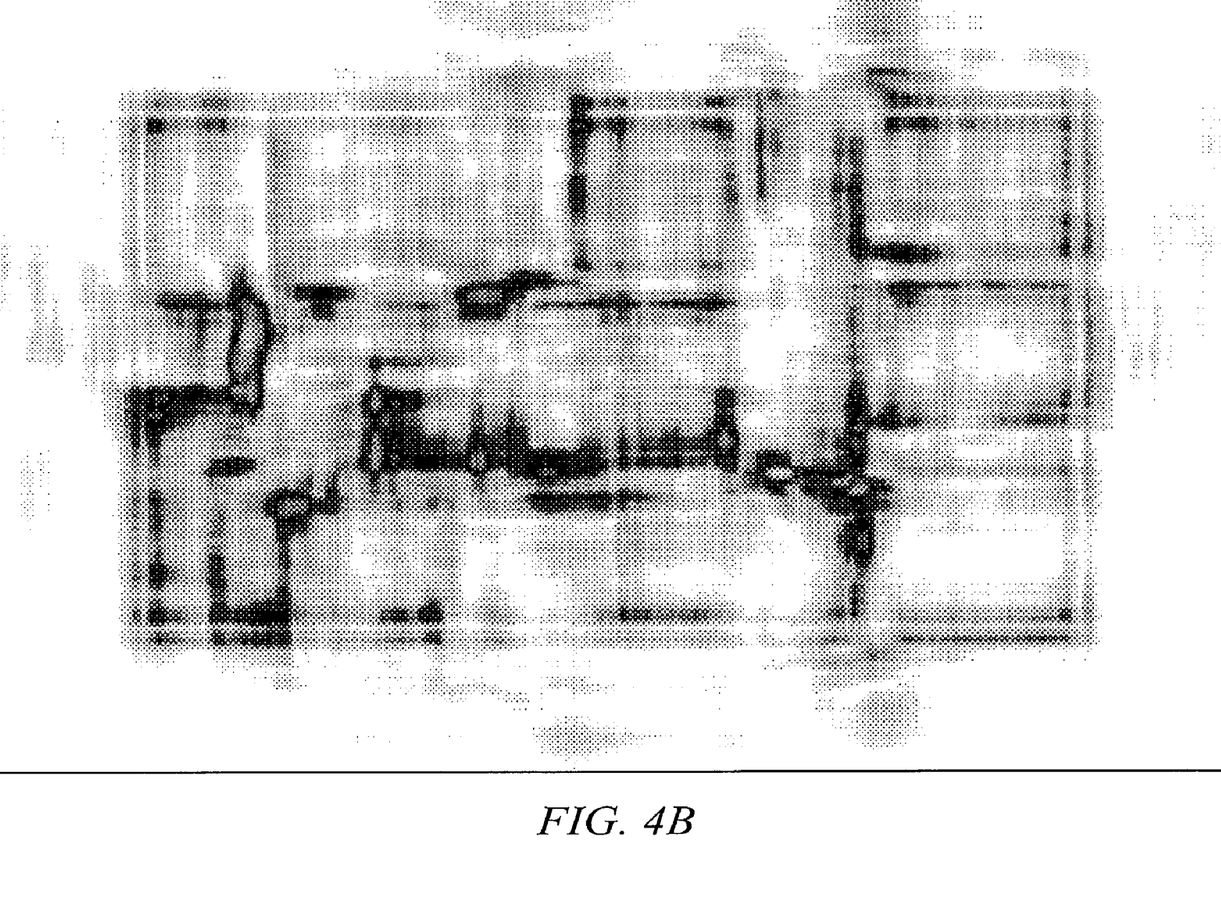
FIG. 4B is an image of the example object of FIG. 4A prior to adjustment of image using one or more material characteristics of the object using the image former of FIG. 1.

FIG. 4B shows an example image of object 18 prior to image enhancement by image former 14. As shown, the example image reveals information about various internal features of object 18 having a relatively large level of aberrations.

Figure 4C:
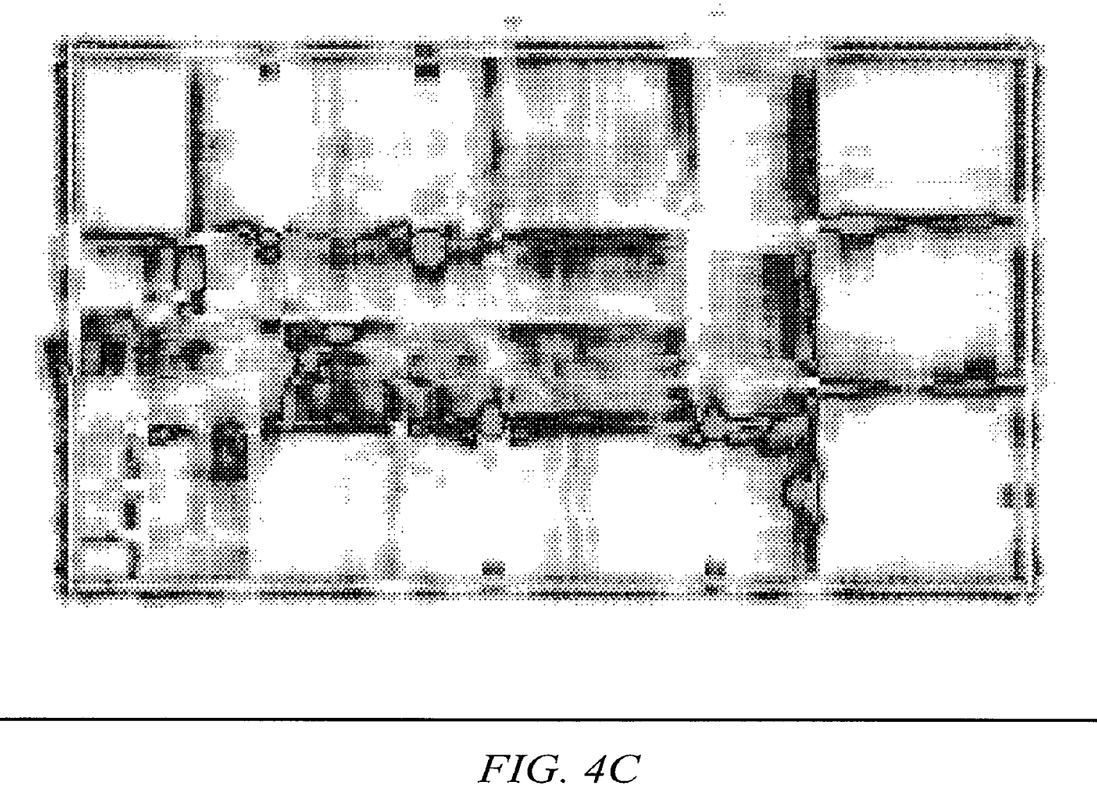
FIG. 4C is an image of the example object of FIG. 4A that has been adjusted according to a phase gradient factor using the image former of FIG. 1.

FIG. 4C shows an example image of object 18 that has been processed by image former 14 to adjust image according to one or more material characteristics 19 of object 18. As shown in this image, compensation using known material characteristics 19 of object 18 has reduced the level of aberrations of the resulting image.

Figure 4D:
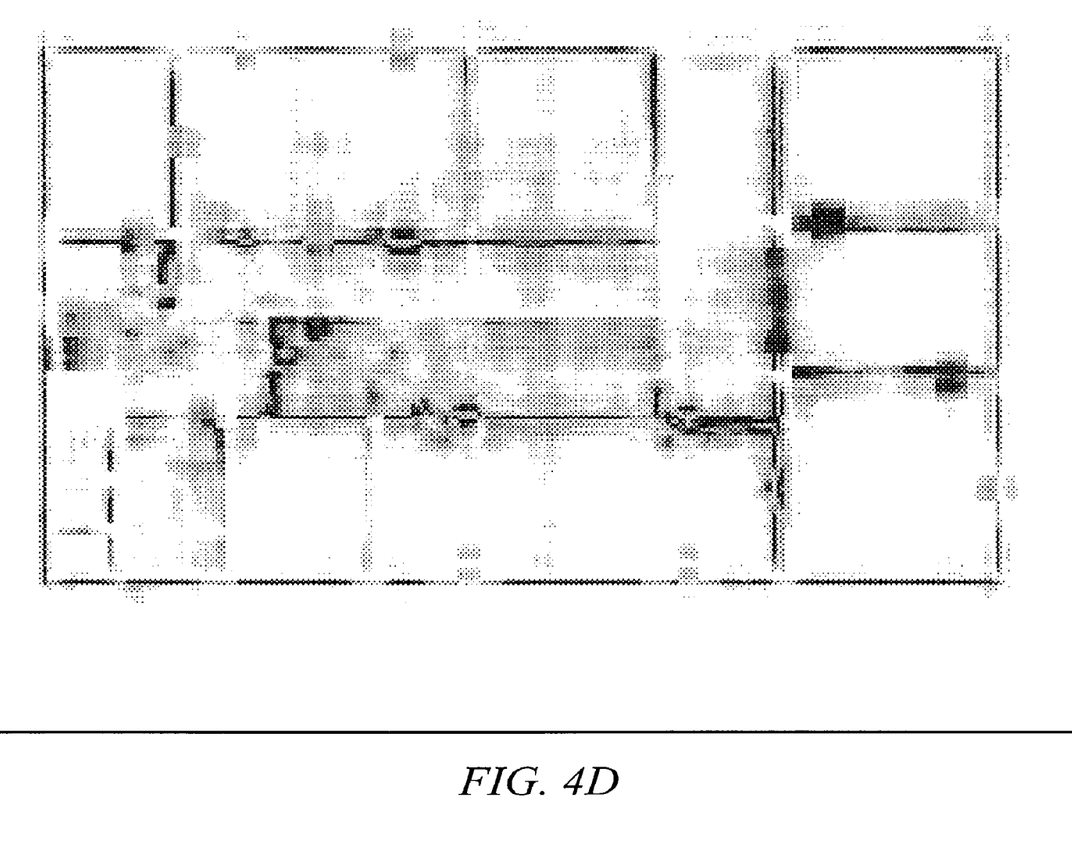
FIG. 4D is an image of the example object of FIG. 4A that has been adjusted using one or more material characteristics and a phase gradient factor using the image former of FIG. 1.

FIG. 4D shows an example image of object 18 that has been processed by image former 14 to adjust image according to one or more material characteristics 19 and a phase gradient factor. As shown, compensation using known material characteristics 19 and filtering using the phase gradient factor has further reduced aberrations of the resulting image.

Modifications, additions, or omissions may be made to image generating device 10 without departing from the scope of the disclosure. The components of image generating system 10 may be integrated or separated. For example, a portion of the instructions comprising image former 14 may be executed on a computing system local to radar 12 and another portion of the instructions may be executed distally from radar 12. Moreover, the operations of image generating device 10 may be performed in real-time during acquisition of information from radar 12 or at a later time following acquisition of information from radar 12. Additionally, the operations of computing system 16 may be performed using any suitable logic comprising software, hardware, and/or other logic.

Figure 5:
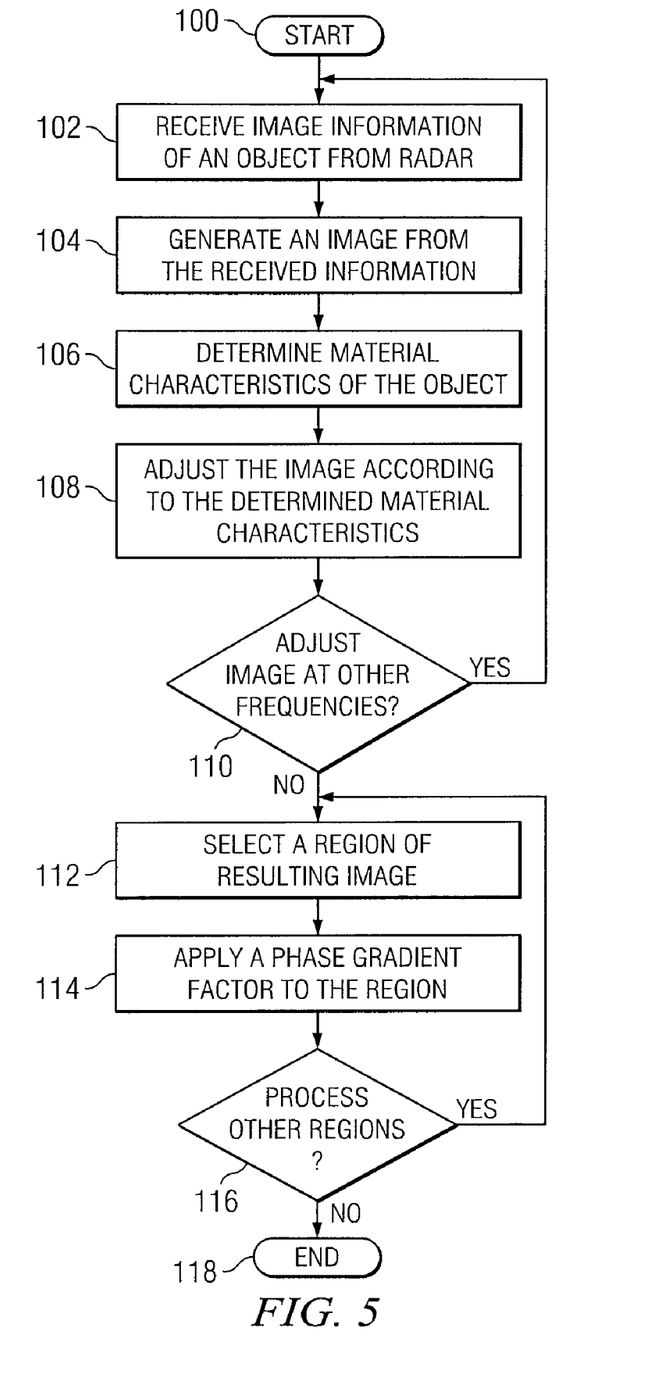
FIG. 5 is a flowchart showing one embodiment of a series of actions that may be performed by the image former of FIG. 1.

FIG. 5 shows one embodiment of a series of actions that may be performed by image former 14 to generate imagery from information received from radar 12. In act 100, the process is initiated.

In act 102, image former 14 receives image information from radar 12. In one embodiment, image information may include phase and/or amplitude information of electro-magnetic energy reflected from object 18.

In act 104, image former 14 generates an image from information received from radar 12 at a particular frequency. In one embodiment, frequencies used by radar 12 may be those having a penetration depth suitable for obtaining information of various internal elements of an object. For objects 18 such as buildings, frequencies in the range of 500 Mega-Hertz to 3 Giga-Hertz penetrate the walls of buildings at levels to form useful information.

In act 106, one or more material characteristics 19 may be determined from the received information. In one embodiment, the material characteristics 19 may be heuristically determined. That is, an educated guess may be made to identify one or more material characteristics 19 of object 18 displayed in the image. In one embodiment, the material characteristics 19 may be determined through manual intervention. In another embodiment, the material characteristics 19 may be determined using an automated artificial intelligence algorithm.

In act 108, the image is adjusted according to the one or more determined material characteristics 19. For the above example, the image may include a region indicating the presence of a concrete wall. Knowing the dielectric properties of concrete in conjunction with common thickness of walls made with concrete, the image may be adjusted so that further acquisition of images may account for the altering effects of the concrete wall on reflected electro-magnetic energy.

Additional images may be generated by repeating acts 102 through 108 again using information obtained from radar 12 at differing frequencies at act 110. If no additional images are to be obtained, the images are combined to form a resulting image and processing continues at act 112.

In act 112, image former 14 selects a region of the combined image for processing. The selected region may be any contiguous portion of the resulting image. In one embodiment, the selected region may overlap previously selected regions to minimize the introduction of processing noise into the image.

In act 114, a phase gradient factor is applied over the selected region. The phase gradient factor may be used to filter noise generated by propagation delay through object 18. For example, a particular region of the image indicating an edge of object 18 may include phase noise due to dissimilarities of electro-magnetic energy propagating through object 18. In one embodiment, phase gradient factor may be selected according to characteristics determined at act 104. That is, characteristics determined using model-based focusing may be used by the data-based focusing technique to further filter noise from the resulting image.

In act 116, if other regions of the resulting image are to be processed, acts 112 and 114 may be repeated. Otherwise, if no other regions are to be processed by image former 14, processing continues at act 118 in which the process ends.

Modifications, additions, or omissions may be made to the method without departing from the scope of the disclosure. The method may include more, fewer, or other acts. For example, image former 14 may include information of images generated at differing position relative to object 18 or from other image generating sources to further enhance the resolution of the resulting image.

Although several embodiments have been illustrated and described in detail, it will be recognized that substitutions and alterations are possible without departing from the spirit and scope of the present disclosure, as defined by the following claims.

What is claimed is:

1. An image generating device comprising:
   an image former comprising a computer-readable media storing code executable by a computer processor of a computing system, the computing system coupled to a radar that is operable to transmit and receive electro-magnetic radiation at a plurality of frequencies in the range of 500 Mega-Hertz to 3 Giga-Hertz, the image former operable, at each of the plurality of frequencies, to:
   receive, from the radar, the electro-magnetic radiation reflected from a building;
   generate an image of the building from the received electro-magnetic radiation; and
   adjust the image according to a plurality of material characteristics of a wall of the building, the plurality of material characteristics comprising a thickness of the wall and a dielectric constant of a material from which the wall is made; and
   wherein the image former is further operable to:
   combine the images generated at the plurality of frequencies to form a resulting image, the resulting image having a plurality of contiguous regions that overlap one another; and
   apply a phase gradient factor to the plurality of contiguous regions, the phase gradient factor comprising an electro-magnetic radiation phase difference between adjacent samples of each of the plurality of contiguous regions.

2. An image generating device comprising:
   an image former comprising a computer-readable media storing code executable by a computer processor of a computing system, the image former operable, at each of a plurality of frequencies, to:
   receive, from a radar, electro-magnetic radiation reflected from an object;
   generate an image of the object from the received electro-magnetic radiation; and
   adjust the image according to a plurality of material characteristics of the object; and
   wherein the image former is further operable to combine the images generated at the plurality of frequencies to form a resulting image; and
   wherein the object is a building having a wall and the plurality of material characteristics comprise a thickness of the wall and a dielectric constant of a material from which the wall is made.

3. The image generating device of claim 2, wherein the image former is operable, at each of the plurality of frequencies, to adjust the image using a plurality of manually determined material characteristics.

4. The image generating device of claim 2, wherein the image former is operable, at each of the plurality of frequencies, to adjust the image using a plurality of material characteristic that are determined using an automated artificial intelligence process.

5. The image generating device of claim 2, wherein the image former is operable, at each of the plurality of frequencies, to adjust the image using a plurality of heuristically determined material characteristics.

6. The image generating device of claim 2, wherein the radar is a synthetic aperture radar.

7. The image generating device of claim 2, wherein the radar is operable to transmit and receive electro-magnetic radiation at a plurality of frequencies in the range of 500 Mega-Hertz to 3 Giga-Hertz.

8. The image generating device of claim 2, wherein the resulting image has a plurality of contiguous regions; and
   wherein the image former is operable to apply an along-range phase gradient factor to one of the contiguous regions, the along-range phase gradient factor comprising an along-range electro-magnetic radiation phase difference between adjacent samples of the contiguous region.

9. The image generating device of claim 8, wherein the plurality of contiguous regions overlap one another; and
   wherein the image former is further operable to apply the along-range phase gradient factor to the plurality of contiguous regions.

10. An image generating method comprising:
    generating, by a radar, electro-magnetic radiation that is transmitted toward an object at a plurality of frequencies;
    at each of the plurality of frequencies:
    receiving reflected electro-magnetic radiation from the object;
    generating an image of the object from the received electro-magnetic radiation; and
    adjusting the image according to a plurality of material characteristics of the object; and
    combining the images generated at the plurality of frequencies to form a resulting image; and
    wherein generating the image of the object comprises generating the image of a building having a wall and the plurality of material characteristics comprise a thickness of the wall and a dielectric constant of a material from which the wall is made.

11. The method of claim 10, further comprising manually determining the plurality of material characteristics of the object.

12. The method of claim 10, further comprising determining the plurality of material characteristics using an automated artificial intelligence process.

13. The method of claim 10, further comprising heuristically determining the plurality of material characteristics of the object.

14. The method of claim 10, wherein generating the electro-magnetic radiation by the radar comprises generating the electro-magnetic radiation by a synthetic aperture radar.

15. The method of claim 10, wherein generating the electro-magnetic radiation at the plurality of frequencies comprises generating the electro-magnetic radiation at a plurality of frequencies in the range of 500 Mega-Hertz to 3 Giga-Hertz.

16. The method of claim 10, wherein the resulting image has a plurality of contiguous regions; and wherein the method further comprises applying an along-range phase gradient factor to one of the contiguous regions, the along-range phase gradient factor comprising an along-range electro-magnetic radiation phase difference between adjacent samples of the contiguous region.

17. The method of claim 16, wherein the plurality of contiguous regions overlap one another; and wherein the method further comprises applying the along-range phase gradient factor to the plurality of contiguous regions.

* * * * *